June 23, 1959

B. SALZBERG 2,892,139

DIELECTRIC MATERIAL AND CONDENSER

Filed April 8, 1946

INVENTOR.
BERNARD SALZBERG
BY M. O. Hayes

ATTORNEY

United States Patent Office 2,892,139
Patented June 23, 1959

2,892,139

DIELECTRIC MATERIAL AND CONDENSER

Bernard Salzberg, Washington, D.C.

Application April 8, 1946, Serial No. 660,386

15 Claims. (Cl. 317—258)

(Granted under Title 35, U.S. Code (1952), sec. 266)

My invention relates to dielectric materials for electrical condensers, and particularly to dielectric materials having unusually high specific inductive capacities and condensers including said dielectrics.

Among the objects of my invention is to provide dielectric material for electrical apparatus which has a dielectric constant many times larger than that of any previously known dielectric.

Another object of my invention is to provide as a dielectric material for electrical condensers, an organic binding material in combination with thin, tiny, metal flakes having a preferred orientation with respect to the lines of force of an electric field in the dielectric.

Another object of my invention is to provide an electrical condenser consisting of at least two electrodes between which is held a dielectric of organic binding material containing quantities of extremely thin metal flakes which are oriented within the binder so that their surfaces of major area, in general, have the direction of the lines of force of an electric field between the electrodes.

Still another object of my invention is to provide a relatively small, lightweight condenser having a much greater capacity per unit volume than existing types of comparative size.

Further and more specific objects will in part be obvious and in part appear hereinafter.

My invention which comprises a dielectric material, contemplates a condenser made therewith, and includes a dielectric material having the features, properties, and relation of elements which will be exemplified in the dielectric and condenser hereinafter described. The scope of the invention will be indicated in the claims.

The dilelectric material of my invention comprises essentially, a low loss, organic binding composition containing a large proportion of extremely thin, metal particles or flakes having a specific preferred orientation with respect to the electric field. In general, for maximum dielectric constant I have found that this orientation should be such that the greater proportion of the flakes is oriented with the surfaces of major area lying approximately parallel to the lines of force of an electric field applied to the dielectric. Dielectric materials embodying my invention have dielectric constants frequently exceeding by several thousandfold those of conventional dielectrics.

While I do not wish to be held rigidly to any particular explanation of the phenomenon involved in the attainment of the specific inductive capacities shown by the dielectric materials of my invention, I believe that the reason why the material has such a high dielectric constant when used in a condenser, is that it effectively reduces the distance between the electrodes and hence effectively increases the capacity of the condenser. One possible explanation of this may be had from a consideration of the following detailed description of the invention when taken in conjunction with the accompanying drawings wherein:

Figure 1:
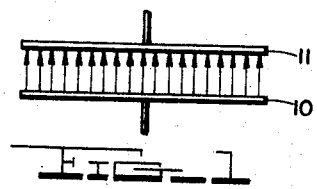
Figure 1 shows diagrammatically a uniform electric field existing between two parallel, metal plates of an air dielectric condenser.

In Figure 1 there is shown diagrammatically a parallel plate condenser with the lines which represent the uniform electric field drawn essentially perpendicular to the plates which are equipotential surfaces. Proceeding from plate 10 toward plate 11, any plane surface between the plates and parallel to them is similarly an equipotential surface, its exact potential depending upon its position relative to plates 10 and 11.

Figure 2:
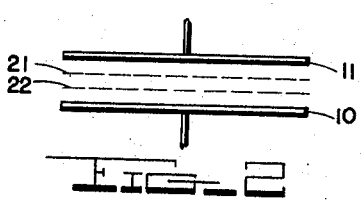
Figure 2 shows in dotted lines two equipotential surfaces between the plates of the condenser of Figure 1.

Figure 2 shows two equipotential surfaces 21 and 22 lying at ⅓ and ⅔ of the distance between plates 10 and 11, end effects being neglected in the showing. These surfaces could theoretically be replaced by sheets of metal of infinitesimal thickness without affecting the total capacity C of the condenser, though the condenser would then in reality consist of three condensers each having a capacity of 3 times C. This may be seen from the equation $$\frac{1}{C} = \frac{1}{3C} + \frac{1}{3C} + \frac{1}{3C}$$

If, however, these two sheets were electrically connected by wires, they would short circuit the equipotential surfaces included between them thereby effectively decreasing the distance between plates 10 and 11. Hence the capacity of the condenser would be increased, for generally, the capacity of such a condenser varies inversely as the distance between its electrodes. This fundamental relation may be expressed mathematically by the equation $$C = k/d$$

where C is the capacity, d is the distance between electrodes, and k is a constant.

The reduction of inter-electrode distance with the resultant increase in capacity is essentially what is accomplished by the dielectric composition of my invention which is illustrated in Figures 3, 4, 5 and 6. The dielectric comprises an organic binding material having dispersed therein individual, tiny, metal flakes whose surfaces of major area are oriented in the direction of the electric field existing in the dielectric, and in the preferred embodiment, substantially all of the metal flakes are oriented in the same direction and lie parallel to the electric field. Generally, it is impossible to get 100 percent uniform orientation of the flakes, but I have found that if about 50 percent or more of the flakes have the preferred orientation, the results and objects of the invention are substantially achieved. The flakes, though not interconnected, short circuit some of the equipotential surfaces existing between the condenser electrodes, thereby effectively decreasing the distance between them and increasing the capacity of the condenser.

Figure 3:
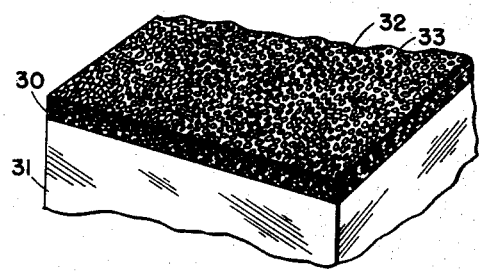
Figure 3 is a perspective showing of a flat plate having firmly adhered thereto a layer of metal flake pigmented binding material.

In Figure 3 is shown a layer or sheet 30 of metal-pigmented binder adhered to a smooth plate 31. The metal flakes 32 are oriented in the binder 33 so that their surfaces of major area are substantially in planes parallel to the plane of the plate. Layers such as this represent the product of the initial step in the production of my dielectric material. In this and the succeeding figures it has been necessary for clarity to exaggerate greatly the dimensions of sheet thickness and pigment size.

Figure 4:
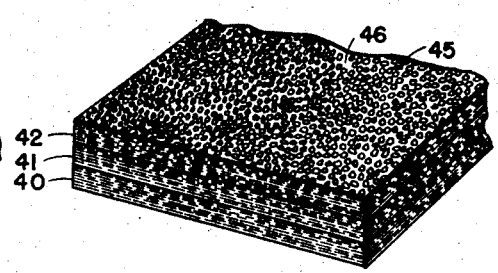
Figure 4 is a perspective showing of a laminated dielectric embodying my invention.

Figure 4 shows a relatively thick laminated sheet of my dielectric, the laminations 40, 41 and 42 comprising sheets of metal flake-pigmented, organic binding material 46 which sheets are similar to the sheet shown in Figure 3. The flakes 45 are oriented essentially with their surfaces of major area in planes parallel to the planes of the laminations. The method and means of laminating will be described hereinafter.

Figure 5:
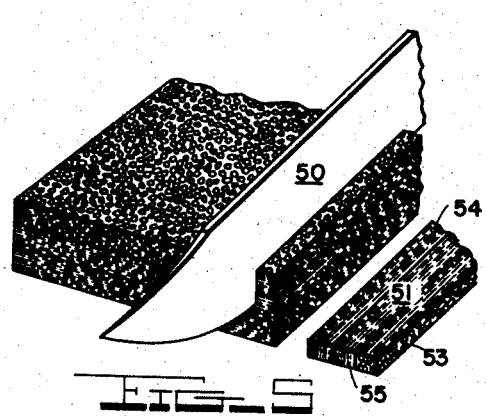
Figure 5 is a perspective showing of a relatively thick laminated sheet of my dielectric material being cut perpendicularly with respect to the parallel planes of orientation of the metal flakes contained therein.

In Figure 5 there is shown a relatively thick laminated sheet such as that described in connection with Figure 4, which sheet is being cut by a knife 50 at substantially right angles to the planes of orientation of major flake surface. The cut sections such as 51 represent specific preferred embodiments of my invention and contain flakes 53 which are oriented so that their surfaces of major area are substantially perpendicular to the cut surfaces 54 and 55. These cut surfaces are those which will be made to contact electrodes to produce electrical condensers.

Figure 6:
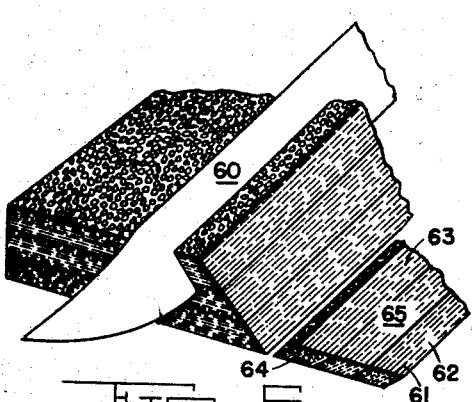
Figure 6 is a perspective showing of another such sheet of my dielectric material being cut at an angle less than 90 degrees with respect to the parallel planes of orientation of the metal flakes contained therein.

Figure 6 illustrates how another similar laminated sheet may be cut by a knife 60 at angles other than 90 degrees to the parallel planes of orientation of major flake surface to produce dielectric sections such as 65 in which the surfaces of major area of the flakes 61 in this binder 62 are not perpendicular to the cut surfaces 63 and 64.

Figure 7:
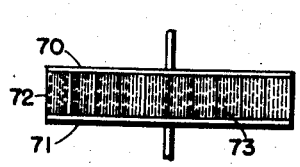
Figure 7 shows a parallel plate condenser in which my dielectric is used.

Figure 7 shows an electrical condenser consisting of two parallel metal electrodes 70 and 71 separated by a laminated section of my dielectric 72. The dielectric contains flakes 73 having a preferred orientation. That is, the flake surfaces of major area are substantially all perpendicular to the planes of the electrodes. Hence the flakes will be oriented in the direction of an electric field existing between the electrodes.

Figure 8:
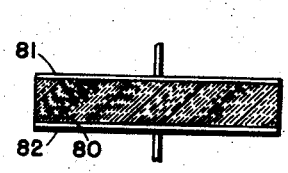
Figure 8 shows another parallel plate condenser in which my dielectric is used, the flake orientation in said dielectric being different with respect to the electrodes from that in the dielectric of Figure 7.

In Figure 8 is shown another parallel plate condenser in which my dielectric is used. Here the major surfaces of the flakes 80 lie at angles other than 90 degrees to the plates 81 and 82.

Figure 9:
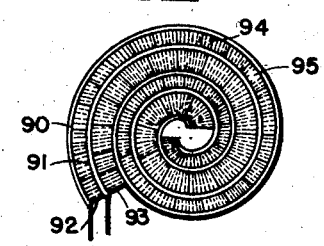
Figure 9 shows a roll type condenser including dielectric material of my invention and represents another embodiment of my invention.

Figure 9 shows another type of electrical condenser embodying my invention. It comprises two thin metal electrodes 90 and 91, e.g., metal foil, rolled into cylindrical form and separated evenly throughout their entire lengths by sections of my dielectric 92 and 93 which dielectric contains metal flakes 94 of preferred orientation and organic binder 95. The orientation of flakes is such that they are substantially radially arranged and thereby lie in the direction of the electric field between the electrodes.

The accomplishment of several specific embodiments of my invention is illustrated by the following examples in which the proportions of ingredients are given as parts by weight unless otherwise specified. Dielectric constants are those obtained by measurement at one megacycle and are not to be considered as absolute for they vary with the completeness with which the preferred orientation is attained.

*Example I*

A suspension of 50 parts of fine aluminum flakes, having a thickness of about 1.0 micron or less, and 30 parts of xylene is stirred into 40 parts of a 10 percent solution of polyisobutylene in xylene. The resulting dispersion is mechanically stirred until uniform and is then poured onto strips of a cellophane-covered backing material. Using a conventional knifing apparatus with the knife blade set at a clearance of 50 mils, the composition is spread in thin layers in which the light aluminum flakes are oriented with their surfaces of major area substantially in planes parallel to the plane of the layers by the combined effects of surface tension and the scraping action of the knife. One such layer is illustrated in Figure 3. These layers are dried at room temperature for several days to allow the solvent to evaporate completely. Dry layers of pigmented binder are removed from their backing material and are laminated under pressure into sheets of desired thickness as illustrated by Figure 4. These relatively thick sheets contain aluminum flakes whose surfaces of major area are substantially oriented in the planes of the sheets. To obtain a product which will have the proper flake orientation for use as a dielectric, the thick sheets are cut substantially perpendicularly into sections of the desired width as indicated in Figure 5. The cut surfaces are those which are placed in contact with electrodes to form electrical condensers. Sections of this material contained about 90 percent by weight of aluminum flakes and when tested, exhibited a dielectric constant of 3000, in marked contrast to the dielectric constant of from 2 to 3 possessed by unpigmented polyisobutylene.

*Example II*

A mixture of 85 parts of polyisobutylene and 15 parts of ester gum is dissolved in 900 parts of cyclohexanone. To this solution is added 425 parts by weight of very thin, flat Permalloy flakes of pigment size. The resulting dispersion is mechanically stirred until uniform and is then cast onto plates. By knifing, the composition is reduced to a very thin layer and the flakes are substantially oriented with their surfaces of major area in planes parallel to the plane of the layer which is allowed to dry at room temperature for several days or until substantially all of the solvent has evaporated. The dry layer may have a thickness from about 10 to about 20 mils. In similar fashion successive layers of the same composition are knifed on, time being allowed for each layer to dry before the next layer is applied. By this means, sheets of pigmented binder of any desired thickness may be built up. These thick sheets are then cut substantially perpendicularly to the planes of orientation of the flakes to produce narrow sections in which the Permalloy flakes representing about 80 percent of the total weight are oriented so that their surfaces of major area are at substantially right angles to the cut surfaces. Samples of this material when tested showed a dielectric constant of 2800.

*Example III*

Eighty-four (84) parts of plasticized polyethylene having a molecular weight of about 10,000 and a dielectric constant of 2 to 3.5 at 1 megacycle is dissolved in 200 parts of cyclohexanone. To the resulting solution 20 parts of flat aluminum flakes of pigment size are added to form a semi-viscous despersion which is heated to about 125° and mechanically stirred at this temperature until uniform in consistency. This composition is poured while still in a reasonably fluid state onto smooth glass plates and knifed to thin films by which knifing operation the aluminum flakes are oriented with their surfaces of major area in planes substantially parallel to the plane of the films. The films are allowed to dry until essentially all of the solvent has evaporated and are then stripped from the plates, laminated and cut in the manner described in Example 1. The cut sections of dielectric material showed a dielectric constant of 1500 and a percentage by weight of aluminum flakes of about 20.

Example IV

Twenty (20) parts of plasticized polyvinyl chloride-acetate containing about 90 percent polyvinyl chloride and known commercially as "Vinylite" is dissolved in 100 parts of acetone. To this solution is added 80 parts of aluminum flakes of the type described in preceding examples. The resulting dispersion is sprayed onto glass plates in thin coats and allowed to dry. The flakes tend to orient themselves substantially with their surfaces of major area in planes parallel to the glass plates. A series of such successive spraying and drying operations is used to build up pliable sheets of 10 to 50 mils in thickness. These sheets are laminated as hereinbefore described and cut at various angles to the planes of orientation as illustrated by Figure 6 to produce other specific embodiments of my invention. These cut sections contain approximately 80 percent by weight of aluminum flakes. A dielectric constant of about 2500 is obtained in sections containing flakes whose surfaces of major area are essentially perpendicular to the cut surfaces. As the flake surfaces are deviated from the perpendicular by cutting the sheets at angles other than 90 degrees, the dielectric constant of the resultant sections is decreased.

Example V 30 parts of plasticized ethyl cellulose known commercially as "Ethocel" and having a dielectric constant of from 2 to 3.5 at one megacycle is dissolved in a mixture of 120 parts of toluol and 24 parts of ethanol. To this solution is added, with stirring, 55 parts of thin Permalloy flakes of pigment size. The resulting dispersion is stirred until uniform and is then sprayed in thin coats onto plates. The Permalloy flakes orient themselves substantially, with their surfaces of major area in planes parallel to the plane of the sprayed coating. The pigmented composition is allowed to dry to evaporate the solvent, and then another thin coat is sprayed over it. By successive spraying and drying operations sheets of material of any desired thickness are obtained which contain about 65 percent by weight of Permalloy flakes. The thick sheets when cut substantially perpendicularly to the planes of flake orientation produce sections of dielectric material which have a dielectric constant of about 2000. When cut at an angle of 45 degrees to the planes of flake orientation the thick sheets produce sections of dielectric having a dielectric constant of about 1750.

The foregoing examples in which I have described the use of preferred metallic pigments, aluminum and Permalloy, are meant to be construed as illustrative and not by way of limitation. Pigment-sized flakes of any of the common metals or alloys may be used as for example, flakes of iron, copper, lead, zinc, gold, silver, magnesium, tin or steel. By pigment size is meant flakes which are extremely thin preferably of the order of thickness of 1.0 micron or less and having diameters not more than about 20 times their thickness. The results in terms of dielectric constant are essentially reproducible but, because it is difficult to control the proportion of flakes oriented, the results should be construed merely as illustrative of the order of magnitude of dielectric constant obtainable.

When my dielectric material is used between electrodes in a condenser, the maximum capacity is obtained when the flakes are oriented with their surfaces of major area parallel to the electric field existing between the plates. This preferred orientation is obtained, as explained in the foregoing examples, by cutting transversely the thick films or sheets which contain flakes oriented with their major surfaces in the plane of the films or sheets. In the cutting operation, however, the thick sheets may be cut at some angle less than 90 degrees with respect to the substantially parallel planes of flake orientation to produce dielectric sections in which the flake surfaces of major area are at less than 90° to the cut surfaces. Figure 6 illustrates this method of cutting. These latter sections of my dielectric have lower dielectric constants and produce condensers which have lower capacities for given size than those in which the perpendicular orientation of flakes is had. In general, for a given flake percentage the capacity of a parallel plate condenser in which my dielectric is used varies from a minimum value at which most of the flakes have their surfaces of major area oriented out of the electric field direction to a maximum value at which these surfaces are perpendicular to the plates.

The original orientation of flakes in the dielectric material may be accomplished by means other than spraying or knifing. Here, the particular means chosen will depend chiefly upon the nature of the binding medium. The more fluid dispersions may be knifed or sprayed; the less fluid, rolled, calendered, or extruded using conventional film forming apparatus. In a dielectric where a ferromagnetic metal such as iron is used as the pigment, the original orientation may be obtained by exposing the dispersion to a strong magnetic field.

Generally, as the proportion of flakes to binder in the dielectric is increased, the dielectric constant is also increased. The preferred ratio of pigment to binder is between 50 and 90% by weight, and the upper limit is fixed by the binding power of the binder which is chosen. The metal flakes may constitute from about 20 to 90% by weight of the dielectric material. Compositions containing more than 90 percent by weight of metal flakes are usually too weak and brittle to be used successfully as a dielectric material for electrical condensers.

In the illustrative examples above, I have described dielectrics having binders of polyisobutylene, polyethylene, polyvinyl chloride-acetate, and ethyl cellulose. In general, any tough, film-forming, organic polymer including cellulose acetate, cellulose nitrate, polystyrene, polyvinyl chloride, polyvinyl butyral, polyvinyl acetate, phenol formaldehyde, urea formaldehyde, melamine formaldehyde, polyacrylate, methyl methacrylate, casein, vinylidene chloride, synthetic rubbers and resins and the like may be used, those preferred normally having a reasonably high break-down potential at radio frequencies.

Briefly, my invention provides a solid dielectric material which has an extremely high specific inductive capacity when compared with existing types. The dielectric constant generally has a value from about 500 to about 3000 or more at one megacycle. It comprises essentially a tough, pliable, organic binding medium in which is intimately dispersed a large proportion by weight of pigment-size, metal flakes which flakes have a specific preferred orientation with respect to an electric field in the dielectric. My invention further provides a relatively small lightweight condenser in which my dielectric is used, which condenser has a much greater capacity per unit size than any existing type of equal size.

The invention described herein may be manufactured and used by or for the government of the United States of America for governmental purposes without the payment of any royalties thereon or therefor.

What is claimed is:

1. An electrical condenser comprising a plurality of electrodes separated by a solid dielectric material, which material comprises an organic, film-forming, binding medium in which is intimately dispersed a material proportion of metal flakes of pigment size, said flakes being in substantial proportion oriented with their surfaces of major area out of the planes of the condenser electrodes.

2. An electrical condenser comprising a plurality of electrodes separated by a solid dielectric material, which material comprises an organic, film-forming, binding medium in which is intimately dispersed metal flakes of pigment size, said flakes representing from about 20 to about 90 percent by weight of said dielectric material and being in substantial proportion oriented with their surfaces of major area out of the planes of the condenser electrodes.

3. An electrical condenser comprising a pair of electrodes separated by a solid dielectric material which material comprises an organic film-forming, binding medium in which is intimately dispersed a material proportion of metal flakes of pigment size which in substantial proportion are oriented with their surfaces of major area substantially perpendicular to the planes of the condenser electrodes.

4. An electrical condenser comprising a pair of electrodes separated by a solid dielectric material which material comprises an organic film-forming, binding medium in which is intimately dispersed metal flakes of pigment size, said flakes representing from about 20 to about 90 percent by weight of said dielectric material and in substantial proportion being oriented with their surfaces of major area substantially perpendicular to the planes of the condenser electrodes.

5. An electrical condenser comprising a pair of electrodes separated by a solid dielectric material which material comprises an organic, film-forming, binding medium which has intimately dispersed therein metal flakes of pigment size in amounts representing from about 20 to about 90 percent by weight of said dielectric material, said flakes being oriented in substantial proportion with their surfaces of major area out of the planes of the condenser electrodes.

6. A sheet of dielectric material comprising a solid, organic, film-forming, binding medium having intimately dispersed therein metal flakes of pigment size, said flakes representing from about 20 to about 90 percent by weight of said dielectric material and in substantial proportion being oriented with their surfaces of major area out of the planes of the surfaces of major area of the dielectric sheet.

7. A sheet of dielectric material comprising a solid, organic, film-forming, binding medium having intimately dispersed therein a material proportion of metal flakes of pigment size which in substantial proportion are oriented with their surfaces of major area out of the planes of the surfaces of major area of the dielectric sheet, said dielectric material having a dielectric constant from about 500 to about 3000 at one megacycle.

8. A sheet of dielectric material comprising a solid, organic, film-forming binding medium having intimately dispersed therein metal flakes of pigment size, said flakes representing from about 20 to about 90 percent by weight of said dielectric material and being in substantial proportion oriented with their surfaces of major area out of the planes of the surfaces of major area of the dielectric sheet, said dielectric material having a dielectric constant from about 500 to about 3000 at one megacycle.

9. A sheet of dielectric material comprising a solid, organic, film-forming binding medium having intimately dispersed therein a material proportion of metal flakes of pigment size, said metal flakes being in substantial proportion oriented with their surfaces of major area substantially perpendicular to the planes of the surfaces of major area of said dielectric sheet.

10. In combination, a solid dielectric element and means disposed relative to said dielectric element for setting-up an electric field therein, said dielectric element comprising an organic film-forming binding medium in which is intimately dispersed from about 20 to 90% by weight of metal flakes of pigment size of which a major proportion have their major surfaces oriented substantially in line with the direction of lines of force in said electric field.

11. In combination, a solid dielectric element and means disposed relative to said dielectric element for setting-up an electric field therein, said dielectric element comprising an organic film-forming binding medium in which is intimately dispersed from about 50 to 90% by weight of metal flakes of pigment size of which a major proportion have their major surfaces oriented substantially in line with the direction of lines of force in said electric field.

12. A body of dielectric material comprising a solid, organic, film-forming binding medium having intimately dispersed therein metal flakes of pigment size, said metal flakes representing from about 20 to 90% by weight of said dielectric material and being in major proportion oriented with their surfaces of major area faced substantially in the same direction in said dielectric material.

13. A sheet of dielectric material comprising a solid, organic, film-forming binding medium having intimately dispersed therein a material proportion of metal flakes of pigment size, said metal flakes being in major proportion oriented with their surfaces of major area substantially perpendicular to the plane of one of the bounding surfaces of said dielectric sheet.

14. A sheet of dielectric material comprising a solid, organic, film-forming binding medium having intimately dispersed therein metal flakes of pigment size, said metal flakes representing from about 20 to about 90% by weight of said dielectric material and being in major proportion oriented with their surfaces of major area substantially perpendicular to the plane of one of the bounding surfaces of said dielectric sheet.

15. A sheet of dielectric material comprising a solid, organic, film-forming binding medium having intimately dispersed therein metal flakes of pigment size, said metal flakes representing from about 50 to 90% by weight of said dielectric material and being in major proportion oriented with their surfaces of major area substantially perpendicular to the plane of one of the bounding surfaces of said dielectric sheet.

References Cited in the file of this patent

UNITED STATES PATENTS

| | | |
|---|---|---|
| 1,947,112 | Ruben | Feb. 13, 1934 |
| 2,046,476 | Meissner | July 7, 1936 |
| 2,280,135 | Ward | Apr. 21, 1942 |
| 2,367,296 | Lutz | Jan. 16, 1945 |
| 2,403,657 | Harvey | July 9, 1946 |